(12) United States Patent
Jojiki

(10) Patent No.: US 9,411,135 B2
(45) Date of Patent: Aug. 9, 2016

(54) IMAGING OPTICAL SYSTEM

(71) Applicant: TAMRON CO., LTD., Saitama-shi, Saitama (JP)

(72) Inventor: Kotaro Jojiki, Saitama (JP)

(73) Assignee: TAMRON CO., LTD., Saitama-shi (JP)

( * ) Notice: Subject to any disclaimer, the term of this patent is extended or adjusted under 35 U.S.C. 154(b) by 0 days.

(21) Appl. No.: 14/830,141

(22) Filed: Aug. 19, 2015

(65) Prior Publication Data

US 2016/0170179 A1 Jun. 16, 2016

(30) Foreign Application Priority Data

Dec. 11, 2014 (JP) .................................. 2014-250831

(51) Int. Cl.
*G02B 9/60* (2006.01)
*G02B 13/00* (2006.01)
*G02B 27/00* (2006.01)

(52) U.S. Cl.
CPC .............. *G02B 13/0045* (2013.01); *G02B 9/60* (2013.01); *G02B 27/0075* (2013.01)

(58) Field of Classification Search
CPC ....... G02B 13/0045; G02B 13/18; G02B 9/60
USPC .......................... 359/713, 714, 740, 763, 770
See application file for complete search history.

(56) References Cited

U.S. PATENT DOCUMENTS

| 4,976,525 A * | 12/1990 | Matsumura ............ G02B 13/18 359/649 |
| 5,673,136 A * | 9/1997 | Inoue ..................... G02B 26/12 359/205.1 |
| 2004/0136085 A1* | 7/2004 | Huang ................... G02B 15/00 359/676 |
| 2013/0100541 A1 | 4/2013 | Huang et al. |

FOREIGN PATENT DOCUMENTS

| JP | 2008-008960 A | 1/2008 |
| JP | 2013-047753 A | 3/2013 |
| JP | 2013-092774 A | 5/2013 |

* cited by examiner

*Primary Examiner* — Scott J Sugarman
(74) *Attorney, Agent, or Firm* — Foley & Lardner LLP

(57) ABSTRACT

An imaging optical system includes sequentially from an object side a front group configured to include a positive lens disposed at a position nearest a diaphragm; the diaphragm; and a rear group configured to include a negative lens disposed at a position nearest the diaphragm. The imaging optical system satisfies a conditional expression (1) $0.27 \leq |\theta 3/\theta 2| \leq 1.80$, where $\theta 3$ represents temperature-dependent variation of relative refractive index for d-line of the negative lens and $\theta 2$ represents temperature-dependent variation of relative refractive index for d-line of the positive lens.

4 Claims, 12 Drawing Sheets

FIRST EMBODIMENT

THIRD EMBODIMENT

FOURTH EMBODIMENT

FIFTH EMBODIMENT

IMAGING OPTICAL SYSTEM

BACKGROUND OF THE INVENTION

1. Field of the Invention

The present invention relates to an imaging optical system.

2. Description of the Related Art

There is a need for surveillance cameras and vehicle cameras to be compact and for imaging optical systems for such cameras to be smaller since space for mounting is often limited. Furthermore, surveillance cameras and vehicle cameras are often used at night, requiring a bright imaging optical system. In response to such demands, numerous imaging optical systems have been proposed that can be mounted on surveillance cameras, vehicle cameras, etc. (for example, refer to Japanese Patent Application Laid-Open Publication Nos. 2013-92774, 2013-47753, and 2008-8960).

The optical system disclosed in Japanese Patent Application Laid-Open Publication No. 2013-92774 is configured by five lenses and has an F number on the order of 2.4. The optical systems disclosed in Japanese Patent Application Laid-Open Publication Nos. 2013-47753 and 2008-8960 are configured by five lenses and have an F number of 2.0.

In recent years, surveillance cameras and vehicle cameras have come down in price and lower-cost imaging optical systems for such cameras are also demanded. Further, with the rapid increases in the pixel density of solid state image sensors (CCD, CMOS, etc.), bright, high-resolution imaging optical systems capable of supporting solid state image sensors with high pixel densities have come to be demanded.

Surveillance cameras are often installed outdoors, where the temperature varies greatly. Further, vehicle cameras are installed inside vehicles, where especially during the summer, the temperature becomes very high. Thus, among imaging optical systems for surveillance cameras and vehicle cameras, an imaging optical system that can maintain high resolution over a wide temperature range, from low temperatures to high temperatures, is demanded. In particular, an optical system having a deep depth of focus is more advantageous in preventing focus errors during extreme temperatures. Further, if the depth of focus is deep, drops in image quality consequent to shifts in lens centers at the time of product assembly can also be prevented.

The optical system described in Japanese Patent Application Laid-Open Publication No. 2013-92774 is configured by five lenses and therefore, has a low manufacturing cost and is also a bright lens having an F number of 2.4. Nonetheless, resolution is low because various types of aberration are not sufficiently corrected, making high quality images difficult to obtain. In particular, since the depth of focus is shallow, focus errors occur easily with extreme temperatures, making high resolution difficult to maintain over a wide temperature range, from low temperatures to high temperatures. If the depth of focus is shallow, a further problem arises in that image quality is easily affected by shifts in lens centers occurring at the time of product manufacturing.

The optical system described in Japanese Patent Application Laid-Open Publication No. 2013-47753 is also configured by five lenses and therefore, has a low manufacturing cost and is a bright lens having an F number of 2.0. Nonetheless, resolution is low because various types of aberration are not sufficiently corrected, making high quality images difficult to obtain. Further, since the temperature coefficient of refractive index of the glass lens material is large, focus errors during extreme temperatures are large, making high resolution difficult to maintain over a wide temperature range, from low temperatures to high temperatures.

The optical system described in Japanese Patent Application Laid-Open Publication No. 2008-8960 is also configured by five lenses and therefore, has a low manufacturing cost and is a bright lens having an F number of 2.0. Nonetheless, resolution is low because various types of aberration are not sufficiently corrected, making high quality images difficult to obtain. Further, similar to the optical system described in Japanese Patent Application Laid-Open Publication No. 2013-92774, since the depth of focus is shallow, focus error occurs easily with extreme temperatures, making high resolution difficult to maintain over a wide temperature range, from low temperatures to high temperatures. If the depth of focus is shallow, a further problem arises in that image quality is easily affected by shifts in lens centers occurring at the time of product manufacturing.

SUMMARY OF THE INVENTION

It is an object of the present invention to at least solve the above problems in the conventional technologies.

An imaging optical system includes sequentially from an object side a front group configured to include a positive lens disposed at a position nearest a diaphragm; the diaphragm; and a rear group configured to include a negative lens disposed at a position nearest the diaphragm. The imaging optical system satisfies a conditional expression (1) $0.27 \leq |\theta 3/\theta 2| \leq 1.80$, where $\theta 3$ represents temperature-dependent variation of relative refractive index for d-line of the negative lens and $\theta 2$ represents temperature-dependent variation of relative refractive index for d-line of the positive lens.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Figure 1:
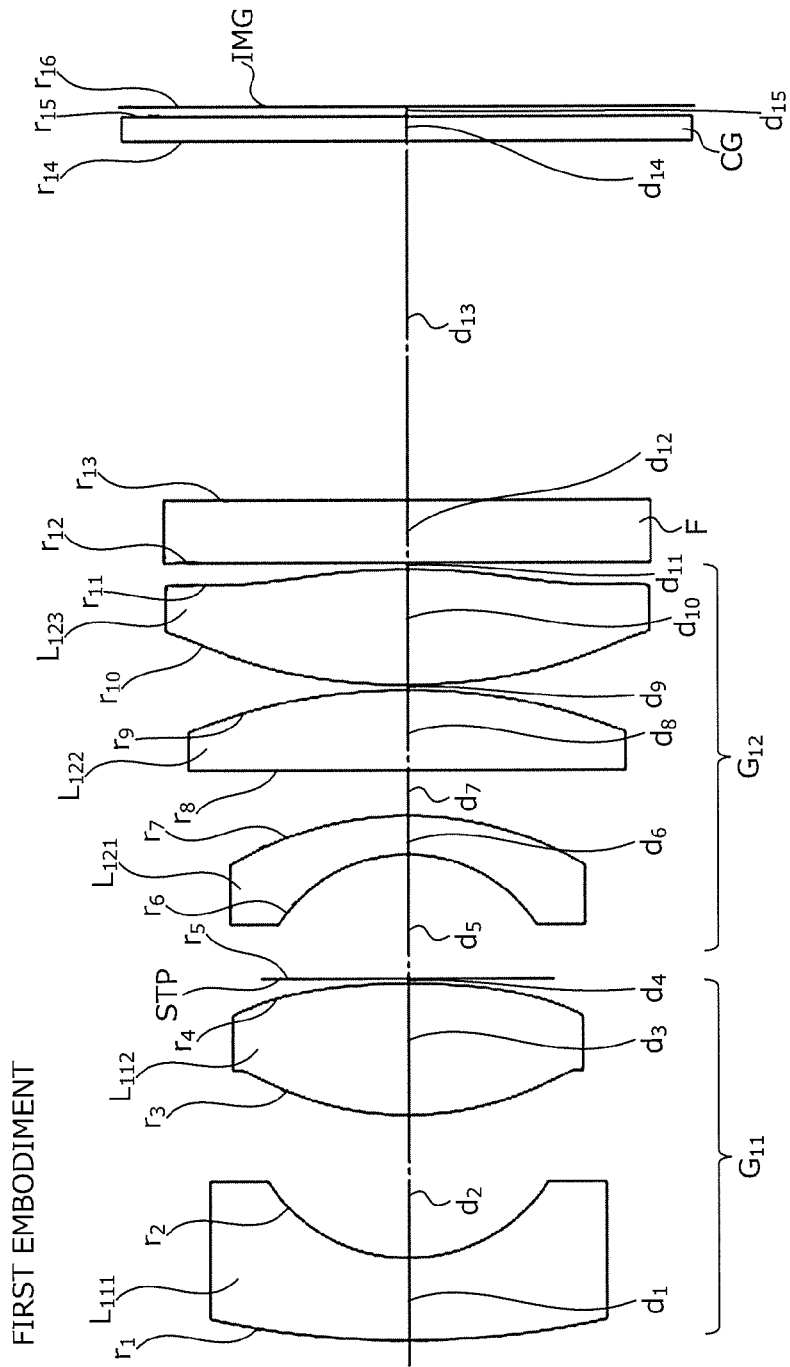
FIG. 1 is a diagram depicting, along an optical axis, a configuration of the imaging optical system according to a first embodiment.

Embodiments of an imaging optical system according to the present invention will be described in detail with reference to the accompanying drawings.

During high or low temperatures, the refractive index of a lens may vary consequent to expansion or contraction of the lens. Variation of the refractive index leads to focus errors in the optical system and drops in resolution. Therefore, to maintain high resolution over a wide temperature range from low temperatures to high temperatures, it is particularly important to properly control refractive index variation of the lens during extreme temperatures and to suppress focus errors of the optical system.

Thus, the imaging optical system according to the present invention is configured to include sequentially from the object side, a front group, a diaphragm, and a rear group. Further, a positive lens is disposed in the front group, at a position nearest the diaphragm, a negative lens is disposed in the rear group, at a position nearest the diaphragm, and the following condition expression is preferably satisfied, where θ3 represents temperature-dependent variation of the relative refractive index for d-line of the negative lens and θ2 represents temperature-dependent variation of the relative refractive index for d-line of the positive lens. The temperature-dependent variation of the relative refractive index is defined by the temperature-dependent variation of the refractive index of air of the same temperature as the lens material.

$$0.27 \leq |\theta 3/\theta 2| \leq 1.80 \tag{1}$$

Conditional expression (1) represents a condition for suppressing focus error during extreme temperatures. Satisfying conditional expression (1) enables focus error to be suppressed during extreme temperatures and high resolution to be maintained over a wide temperature range, from low temperatures to high temperatures. In the present invention, temperature-dependent variation of relative refractive index for d-line of the lens disposed nearest the diaphragm and most easily influencing drops in resolution consequent to temperature variation is prescribed.

Below the lower limit of conditional expression (1), temperature-dependent variation of the relative refractive index for d-line of the material that can be used for the positive lens disposed in the front group, at a position nearest the diaphragm, becomes too great, whereby focus error during extreme temperatures increases and resolution drops. Meanwhile, above the upper limit of conditional expression (1), temperature-dependent variation of the relative refractive index for d-line of the material that can be used for the positive lens disposed in the front group, at a position nearest the diaphragm becomes too small, whereby focus error during extreme temperatures increases and resolution drops.

An even more desirable effect can be expected by satisfying conditional expression (1) within the following range.

$$0.49 \leq |\theta 3/\theta 2| \leq 1.45 \tag{1a}$$

Satisfying the range prescribed by conditional expression (1a) enables higher resolution to be maintained even with extreme temperatures.

In the imaging optical system according to the present invention, to favorably correct spherical aberration, the negative lens disposed in the rear group at a position nearest the diaphragm preferably has a concave surface on the object side. If the surface on the object side of the negative lens is convex, the occurrence of spherical aberration becomes conspicuous, leading to drops in resolution.

Further, to prevent focus error from occurring with extreme temperatures, the range of the depth of focus is increased, i.e., the depth of focus of the optical system is made deep.

Thus, the imaging optical system according to the present invention preferably satisfies the following conditional expressions, where F2 represents the focal length of the rear group, f21 represents the focal length of the negative lens disposed in the rear group, at a position nearest the diaphragm, F1 represents the focal length of the front group, and f12 represents the focal length of the positive lens disposed in the front group, at a position nearest the diaphragm.

$$-2.4 \leq F2/f21 \leq -1.3 \tag{2}$$

$$1.00 \leq F1/f12 \leq 1.65 \tag{3}$$

Conditional expressions (2) and (3) represent conditions to make the depth of focus of the optical system deep. Satisfying conditional expressions (2) and (3) enables an imaging optical system having a deep depth of focus to be realized. If the depth of focus is deep, the occurrence of focus error is suppressed even during extreme temperatures and high resolution can be maintained over a wide temperature range, from low temperatures to high temperatures. Further, if the depth of focus is deep, image quality is not easily affected by shifts in lens centers occurring at the time of product manufacturing, enabling favorable image quality to be maintained.

Below the lower limit of conditional expression (2), the correction of spherical aberration is insufficient and the depth of focus becomes shallow. Meanwhile, above the upper limit of conditional expression (2), spherical aberration is over corrected and resolution drops.

An even more desirable effect can be expected by satisfying conditional expression (2) within the following range.

$$-2.04 \leq F2/f21 \leq -1.51 \tag{2a}$$

Satisfying the range prescribed by conditional expression (2a) enables spherical aberration to be corrected more favorably and the depth of focus of the optical system to be deep.

Below the lower limit of conditional expression (3), spherical aberration becomes over corrected and resolution drops. Meanwhile, above the upper limit of conditional expression (3), the correction of spherical aberration is insufficient and the depth of focus becomes shallow.

An even more desirable effect can be expected by satisfying conditional expression (3) within the following range.

$$1.25 \leq F1/f12 \leq 1.54 \tag{3a}$$

Satisfying the range prescribed by conditional expression (3a) enables spherical aberration to be corrected more favorably and the depth of focus of the optical system to be deep.

In the imaging optical system according to the present invention, the rear group preferably includes sequentially from the object side, a first lens, a second lens, and a third lens, and the following conditional expression is preferably satisfied where, ν22 represents the Abbe number for d-line of the second lens and ν21 represents the Abbe number for d-line of the first lens.

$$3.6 \leq \nu 22/\nu 21 \leq 5.6 \tag{4}$$

Conditional expression (4) represents a condition for suppressing chromatic aberration of magnification and astigmatism. Satisfying conditional expression (4) enables chromatic aberration of magnification and astigmatism to be favorably corrected and high resolution to be maintained.

Below the lower limit of conditional expression (4), dispersion of the second lens of the rear group becomes too small, chromatic aberration of magnification becomes difficult to correct, and resolution drops. Meanwhile, above the upper limit of conditional expression (4), astigmatism becomes difficult to correct and resolution drops.

An even more desirable effect can be expected by satisfying conditional expression (4) within the following range.

$$3.9 \leq v22/v21 \leq 5.2 \qquad (4a)$$

Satisfying the range prescribed by conditional expression (4a) enables chromatic aberration of magnification and astigmatism to be more favorably corrected.

In the imaging optical system according to the present invention, the rear group preferably includes sequentially from the object side, a first lens, a second lens, and a third lens, and the following conditional expression is preferably satisfied, where f23 represents the focal length of the third lens and F1 represents the focal length of the front group.

$$1.15 \leq |f23/F1| \leq 3.0 \qquad (5)$$

Conditional expression (5) represents a condition for favorably correcting distortion and preventing drops in peripheral illumination. Satisfying conditional expression (5) enables distortion to be favorably corrected, drops in peripheral illumination to be prevented, and high resolution to be maintained.

Below the lower limit of conditional expression (5), the power of the front group becomes too weak with respect to the rear group, distortion becomes difficult to correct, and resolution drops. Meanwhile, above the upper limit of conditional expression (5), the refractive power of the third lens of the rear group becomes too weak, the incident angle of the principal ray to the image plane becomes too large, and peripheral illumination and resolution drop.

An even more desirable effect can be expected by satisfying conditional expression (5) within the following range.

$$1.56 \leq |f23/F1| \leq 2.64 \qquad (5a)$$

Satisfying the range prescribed by conditional expression (5a) enables improved resolution.

In the imaging optical system according to the present invention, as described above, the rear group is configured by three lenses, however, the number of lenses configuring the front group is not specified. In other words, although the front group has to have at least one lens, the front group may be configured by two lenses, or by three lenses. However, if the number of lenses is reduced, various types of aberration become difficult to correct and focus error during extreme temperatures increases, leading to drops in resolution. Therefore, to maintain high resolution while suppressing manufacturing cost, the front group is preferably configured by two lenses.

As described, the imaging optical system according to the present invention has the configuration above whereby, properly prescribing temperature-dependent variation of the relative refractive index of the lenses enables an imaging optical system that can maintain high resolution over a wide temperature range, from low temperatures to high temperatures to be provided at a low cost.

In addition, an imaging optical system having a deep depth of focus can be provided. If the depth of focus is deep, the occurrence of focus error is suppressed during extreme temperatures and high resolution can be maintained over a wide temperature range, from low temperatures to high temperatures. Further, if the depth of focus is deep, image quality is not easily affected by shifts in lens centers occurring at the time of product manufacturing.

The imaging optical system of the present invention having the characteristics described is particularly suitable for surveillance cameras, vehicle cameras, etc. used under conditions of extreme environmental temperature changes.

Embodiments of the imaging optical system according to the present invention will be described in detail with reference to the accompanying drawings. The present invention is not limited by the embodiments.

FIG. 1 is a diagram depicting, along the optical axis, a configuration of the imaging optical system according to a first embodiment. The imaging optical system is configured to include sequentially from the object side nearest a non-depicted object, a front group $G_{11}$ having a positive refractive power, a diaphragm STP prescribing a given aperture, and a rear group $G_{12}$ having a positive refractive power. Between the rear group $G_{12}$ and an image plane IMG, an optical filter F and a cover glass CG are disposed sequentially from the object side. At the image plane IMG, the light receiving surface of a solid state image sensor is disposed.

The front group $G_{11}$ is configured to include sequentially from the object side, a negative lens $L_{111}$ and a positive lens $L_{112}$. Both surfaces of the positive lens $L_{112}$ are aspheric.

The rear group $G_{12}$ is configured to include sequentially from the object side, a negative lens $L_{121}$ (first lens), a positive lens $L_{122}$ (second lens), and a positive lens $L_{123}$ (third lens). The surface on the object side of the negative lens $L_{121}$ is concave. Both surfaces of the positive lens $L_{123}$ are aspheric.

Here, various types of data related to the imaging optical system according to the first embodiment are given.

--- f (focal length of entire imaging optical system) = 6.0
Fno. (F number) = 2.0
2ω (angle of view) = 60.0
(Lens data)
$r_1$ = 14.6435
  $d_1$ = 1.3224            $nd_1$ = 1.658      $vd_1$ = 50.85
$r_2$ = 2.6278
  $d_2$ = 2.2613
$r_3$ = 5.0017 (aspheric)
  $d_3$ = 2.0875            $nd_2$ = 1.851      $vd_2$ = 40.10
$r_4$ = −11.3152 (aspheric)
  $d_4$ = 0.0759
$r_5$ = ∞ (diaphragm)
  $d_5$ = 1.9704
$r_6$ = −2.4167
  $d_6$ = 0.6151            $nd_3$ = 1.946      $vd_3$ = 17.98
$r_7$ = −5.3862
  $d_7$ = 0.7218
$r_8$ = −4676.3070
  $d_8$ = 1.2966            $nd_4$ = 1.593      $vd_4$ = 68.62
$r_9$ = −9.0585
  $d_9$ = 0.0772
$r_{10}$ = 9.3738 (aspheric)
  $d_{10}$ = 1.8418           $nd_5$ = 1.592      $vd_5$ = 67.02
$r_{11}$ = −9.1137 (aspheric)
  $d_{11}$ = 0.1000
$r_{12}$ = ∞
  $d_{12}$ = 1.0000           $nd_6$ = 1.516      $vd_6$ = 64.14
$r_{13}$ = ∞
  $d_{13}$ = 5.7000
$r_{14}$ = ∞
  $d_{14}$ = 0.4000           $nd_7$ = 1.516      $vd_7$ = 64.14
$r_{15}$ = ∞
  $d_{15}$ = 0.1512
$r_{16}$ = ∞ (image plane)
Constant of the cone (ϵ) and aspheric coefficients (A, B, C, D, E)
(Third order)
ϵ = 1, -continued A = 5.45426 × 10⁻⁴, B = −5.10209 × 10⁻⁶,
C = −1.92183 × 10⁻⁵, D = 1.33392 × 10⁻⁷,
E = −8.97359 × 10⁻⁸
(Fourth order)
ε = 1,
A = −2.49645 × 10⁻³, B = −5.92804 × 10⁻⁶,
C = −9.19254 × 10⁻⁶, D = 1.34117 × 10⁻⁶,
E = −1.08535 × 10⁻⁷
(Tenth order)
ε = 1,
A = 1.82213 × 10⁻⁴, B = 6.38939 × 10⁻⁵,
C = 2.67778 × 10⁻⁶, D = −5.92153 × 10⁻⁷,
E = 6.62019 × 10⁻⁹
(Eleventh order)
ε = 1,
A = 2.62777 × 10⁻³, B = 5.31356 × 10⁻⁵,
C = 9.09030 × 10⁻⁶, D = −1.10441 × 10⁻⁶,
E = 1.74049 × 10⁻⁸
(Values related to conditional expression (1))
θ3 (temperature-dependent variation of relative refractive index for d-line of negative lens $L_{121}$) = 3.7
θ2 (temperature-dependent variation of relative refractive index for d-line of positive lens $L_{112}$) = 7.5
|θ3/θ2| = 0.49
(Values related to conditional expression (2))
F2 (focal length of rear group $G_{12}$) = 12.08
f21 (focal length of negative lens $L_{121}$) = −5.15
F2/f21 = −2.34
(Values related to conditional expression (3))
F1 (focal length of front group $G_{11}$) = 6.87
f12 (focal length of positive lens $L_{112}$) = 4.33
F1/f12 = 1.59
(Values related to conditional expression (4))
υ22 (Abbe number for d-line of positive lens $L_{122}$ (second lens)) = 68.62
υ21 (Abbe number for d-line of negative lens $L_{121}$ (first lens)) = 17.98
υ22/υ21 = 3.81
(Values related to conditional expression (5))
f23 (focal length of positive lens $L_{123}$ (third lens)) = 8.11
F1 (focal length of front group $G_{11}$) = 6.87
|f23/F1| = 1.18

Figure 2:
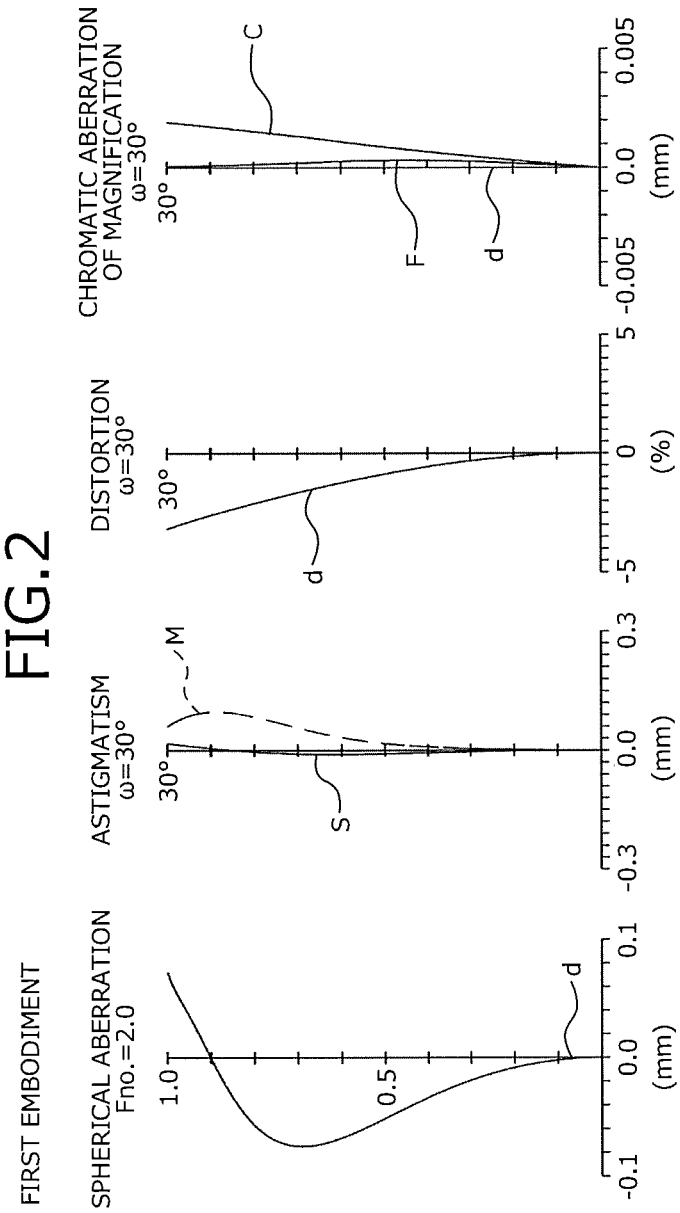
FIG. 2 is a diagram of various types of aberration occurring in the imaging optical system according to the first embodiment.

FIG. 2 is a diagram of various types of aberration occurring in the imaging optical system according to the first embodiment. In the diagram, for the curve depicting spherical aberration, the vertical axis represents the F number (Fno.) and wavelength characteristics corresponding to d-line (λ=587.56 nm) are depicted. For curves depicting astigmatism, the vertical axis represents the half angle of view (ω) and wavelength characteristics corresponding to d-line (λ=587.56 nm) are depicted. For curves depicting astigmatism, the solid line depicts characteristics of the sagittal plane (S) and the broken line depicts characteristics on the meridonal plane (M). For the curve depicting distortion, the vertical axis represents the half angle of view (ω) and wavelength characteristics corresponding to d-line (λ=587.56 nm) are depicted. For curves depicting chromatic aberration of magnification, the vertical axis represents the half angle of view (ω), d represents wavelength characteristics corresponding to d-line (λ=587.56 nm), F represents wavelength characteristics corresponding to F-line (λ=486.13 nm), and C represents wavelength characteristics corresponding to C-line (λ=656.27 nm).

Figure 3:
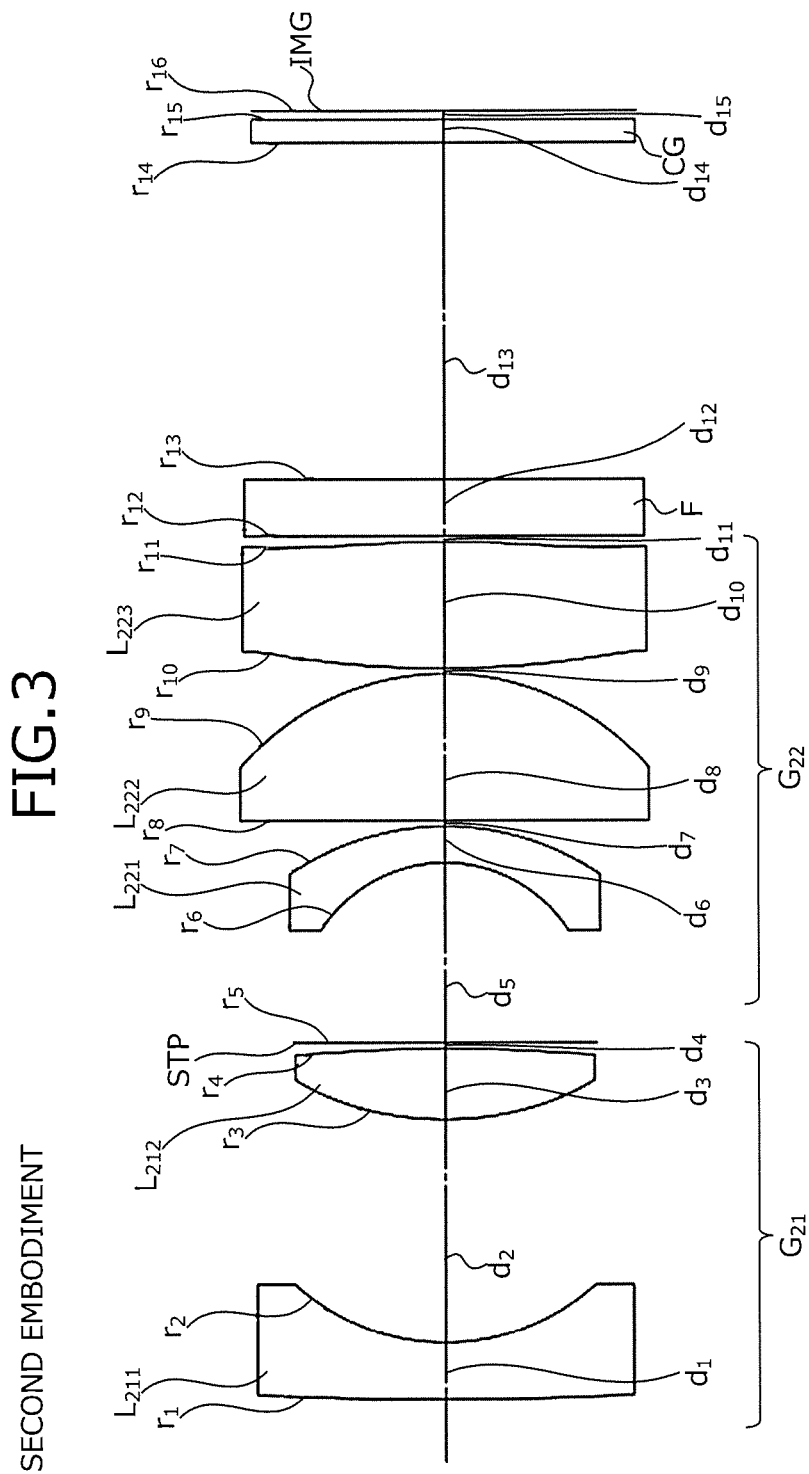
FIG. 3 is a diagram depicting, along the optical axis, a configuration of the imaging optical system according to a second embodiment.

FIG. 3 is a diagram depicting, along the optical axis, a configuration of the imaging optical system according to a second embodiment. The imaging optical system is configured to include sequentially from the object side nearest a non-depicted object, a front group $G_{21}$ having a positive refractive power, the diaphragm STP prescribing a given aperture, and a rear group $G_{22}$ having a positive refractive power. Between the rear group $G_{22}$ and the image plane IMG, the optical filter F and the cover glass CG are disposed sequentially from the object side. At the image plane IMG, the light receiving surface of the solid state image sensor is disposed.

The front group $G_{21}$ is configured to include sequentially from the object side, a negative lens $L_{211}$ and a positive lens $L_{212}$. Both surfaces of the positive lens $L_{212}$ are aspheric.

The rear group $G_{22}$ is configured to include sequentially from the object side, a negative lens $L_{221}$ (first lens), a positive lens $L_{222}$ (second lens), and a positive lens $L_{223}$ (third lens). The surface on the object side of the negative lens $L_{221}$ is concave. Both surfaces of the positive lens $L_{223}$ are aspheric.

Here, various types of data related to the imaging optical system according to the second embodiment are given.

f (focal length of entire imaging optical system) = 6.0
Fno. (F number) = 2.0
2ω (angle of view) = 60.0
(Lens data)
r₁ = 65.8266
 d₁ = 1.0116   nd₁ = 1.658   υd₁ = 50.85
r₂ = 3.8349
 d₂ = 3.9183
r₃ = 5.6968 (aspheric)
 d₃ = 1.2437   nd₂ = 1.821   υd₂ = 42.71
r₄ = −23.2935 (aspheric)
 d₄ = 0.0981
r₅ = ∞ (diaphragm)
 d₅ = 3.1501
r₆ = −2.5463
 d₆ = 0.6333   nd₃ = 2.003   υd₃ = 19.32
r₇ = −4.7523
 d₇ = 0.0978
r₈ = ∞
 d₈ = 2.5992   nd₄ = 1.497   υd₄ = 81.61
r₉ = −4.6138
 d₉ = 0.0923
r₁₀ = 18.5992 (aspheric)
 d₁₀ = 2.2238   nd₅ = 1.592   υd₅ = 67.02
r₁₁ = −19.1491 (aspheric)
 d₁₁ = 0.1000
r₁₂ = ∞
 d₁₂ = 1.0000   nd₆ = 1.516   υd₆ = 64.14
r₁₃ = ∞
 d₁₃ = 5.9000
r₁₄ = ∞
 d₁₄ = 0.4000   nd₇ = 1.516   υd₇ = 64.14
r₁₅ = ∞
 d₁₅ = 0.1568
r₁₆ = ∞ (image plane)
Constant of the cone (ε) and aspheric coefficients (A, B, C, D, E)
(Third order)
ε = 1,
A = 9.52503 × 10⁻⁴, B = 9.49260 × 10⁻⁵,
C = −1.65311 × 10⁻⁵, D = 2.07115 × 10⁻⁶,
E = −3.78499 × 10⁻⁸
(Fourth order)
ε = 1,
A = 3.53564 × 10⁻⁴, B = 1.16745 × 10⁻⁴,
C = −3.05943 × 10⁻⁵, D = 4.71509 × 10⁻⁶,
E = −2.04009 × 10⁻⁷
(Tenth order)
ε = 1,
A = 4.83657 × 10⁻⁴, B = −5.52837 × 10⁻⁵,
C = 6.65896 × 10⁻⁶, D = −5.30466 × 10⁻⁷,
E = −7.03815 × 10⁻¹⁰
(Eleventh order)
ε = 1,
A = 1.77671 × 10⁻³, B = −8.75517 × 10⁻⁶,
C = 5.24423 × 10⁻⁶, D = −5.51386 × 10⁻⁷,
E = 5.19802 × 10⁻⁹
(Values related to conditional expression (1))
θ3 (temperature-dependent variation of relative refractive index for d-line of negative lens $L_{221}$) = 6.8
θ2 (temperature-dependent variation of relative refractive index for d-line of positive lens $L_{212}$) = 6.1
|θ3/θ2| = 1.11
(Values related to conditional expression (2))

-continued

F2 (focal length of rear group $G_{22}$) = 12.14
f21 (focal length of negative lens $L_{221}$) = −6.39
F2/f21 = −1.90
(Values related to conditional expression (3))
F1 (focal length of front group $G_{21}$) = 7.77
f12 (focal length of positive lens $L_{212}$) = 5.69
F1/f12 = 1.37
(Values related to conditional expression (4))
υ22 (Abbe number for d-line of positive lens $L_{222}$ (second lens)) = 81.61
υ21 (Abbe number for d-line of negative lens $L_{221}$ (first lens)) = 19.32
υ22/υ21 = 4.22
(Values related to conditional expression (5))
f23 (focal length of positive lens $L_{223}$ (third lens)) = 16.29
F1 (focal length of front group $G_{21}$) = 7.77
|f23/F1| = 2.10

Figure 4:
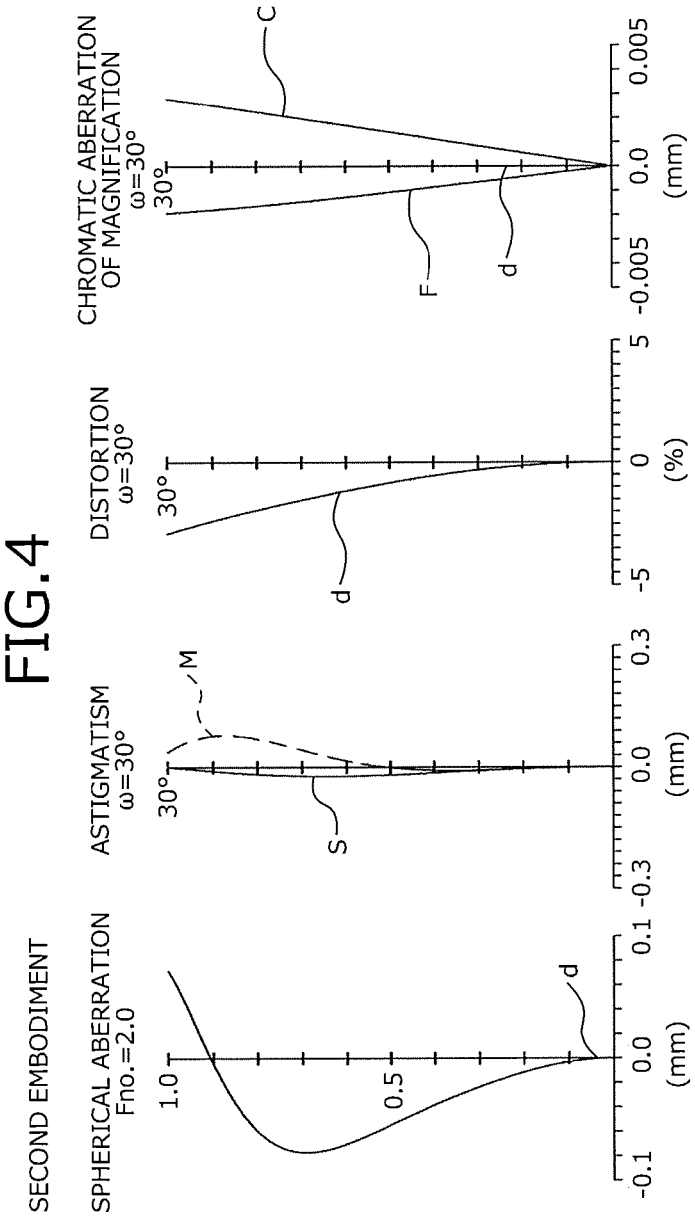
FIG. 4 is a diagram of various types of aberration occurring in the imaging optical system according to the second embodiment.

FIG. 4 is a diagram of various types of aberration occurring in the imaging optical system according to the second embodiment. In the diagram, for the curve depicting spherical aberration, the vertical axis represents the F number (Fno.) and wavelength characteristics corresponding to d-line (λ=587.56 nm) are depicted. For curves depicting astigmatism, the vertical axis represents the half angle of view (ω) and wavelength characteristics corresponding to d-line (λ=587.56 nm) are depicted. For curves depicting astigmatism, the solid line depicts characteristics of the sagittal plane (S) and the broken line depicts characteristics on the meridonal plane (M). For the curve depicting distortion, the vertical axis represents the half angle of view (ω) and wavelength characteristics corresponding to d-line (λ=587.56 nm) are depicted. For curves depicting chromatic aberration of magnification, the vertical axis represents the half angle of view (ω), d represents wavelength characteristics corresponding to d-line (λ=587.56 nm), F represents wavelength characteristics corresponding to F-line (λ=486.13 nm), and C represents wavelength characteristics corresponding to C-line (λ=656.27 nm).

Figure 5:
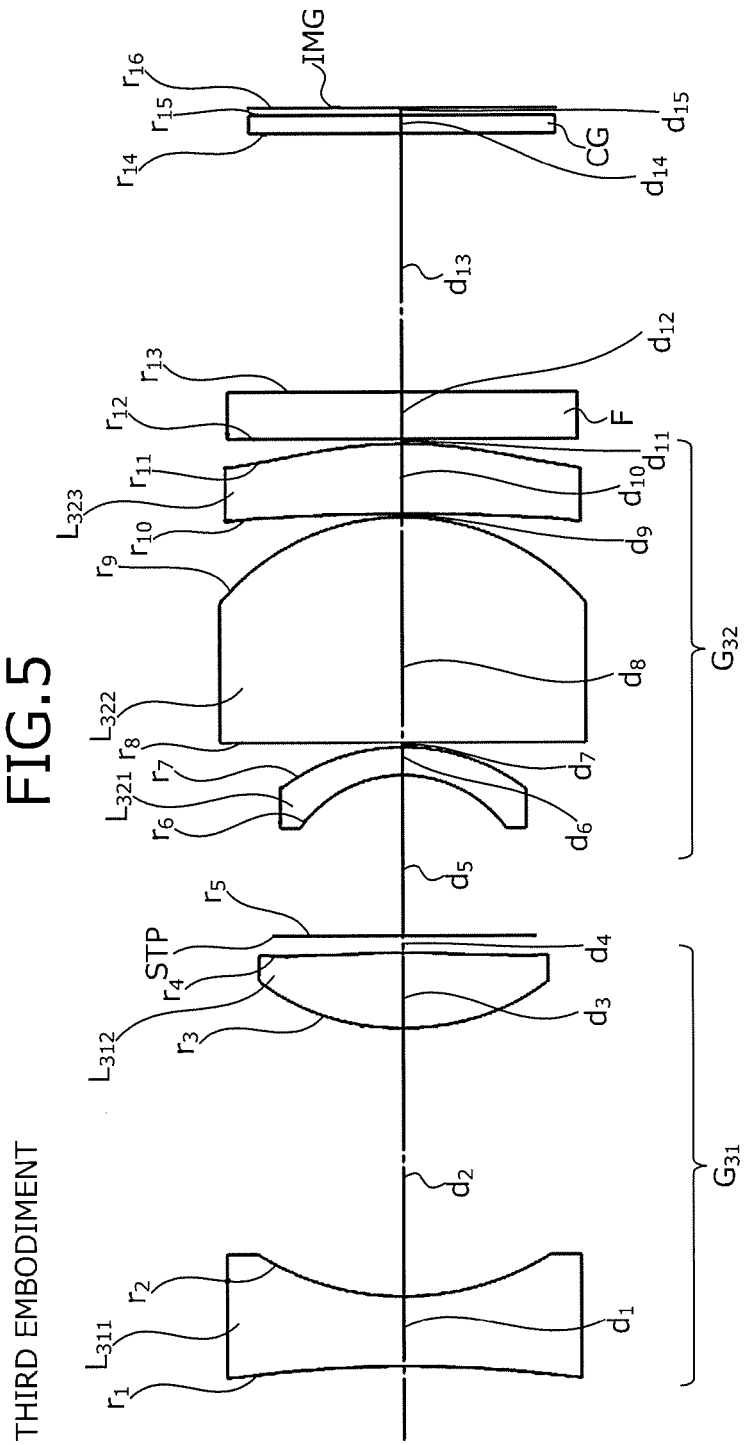
FIG. 5 is a diagram depicting, along the optical axis, a configuration of the imaging optical system according to a third embodiment.

FIG. 5 is a diagram depicting, along the optical axis, a configuration of the imaging optical system according to a third embodiment. The imaging optical system is configured to include sequentially from the object side nearest a non-depicted object, a front group $G_{31}$ having a positive refractive power, the diaphragm STP prescribing a given aperture, and a rear group $G_{32}$ having a positive refractive power. Between the rear group $G_{32}$ and the image plane IMG, the optical filter F and the cover glass CG are disposed sequentially from the object side. At the image plane IMG, the light receiving surface of the solid state image sensor is disposed.

The front group $G_{31}$ is configured to include sequentially from the object side, a negative lens $L_{311}$ and a positive lens $L_{312}$. Both surfaces of the positive lens $L_{312}$ are aspheric.

The rear group $G_{32}$ is configured to include sequentially from the object side, a negative lens $L_{321}$ (first lens), a positive lens $L_{322}$ (second lens), and a positive lens $L_{323}$ (third lens). The surface on the object side of the negative lens $L_{321}$ is concave. Both surfaces of the positive lens $L_{323}$ are aspheric.

Here, various types of data related to the imaging optical system according to the third embodiment are given.

f (focal length of entire imaging optical system) = 6.0
Fno. (F number) = 2.0
2ω (angle of view) = 60.0
(Lens data)
$r_1$ = −27.1372
 $d_1$ = 1.5009   $nd_1$ = 1.658   $υd_1$ = 50.85
$r_2$ = 5.7712
 $d_2$ = 5.7163

-continued $r_3$ = 5.5663 (aspheric)
 $d_3$ = 1.5947   $nd_2$ = 1.773   $υd_2$ = 49.50
$r_4$ = −30.5705 (aspheric)
 $d_4$ = 0.3760
$r_5$ = ∞ (diaphragm)
 $d_5$ = 3.3979
$r_6$ = −2.6664
 $d_6$ = 0.5925   $nd_3$ = 2.104   $υd_3$ = 17.02
$r_7$ = −4.2419
 $d_7$ = 0.0990
$r_8$ = ∞
 $d_8$ = 4.8050   $nd_4$ = 1.437   $υd_4$ = 95.01
$r_9$ = −4.9880
 $d_9$ = 0.0762
$r_{10}$ = −40.4531 (aspheric)
 $d_{10}$ = 1.4934   $nd_5$ = 1.592   $υd_5$ = 67.02
$r_{11}$ = −8.9340 (aspheric)
 $d_{11}$ = 0.1000
$r_{12}$ = ∞
 $d_{12}$ = 1.0000   $nd_6$ = 1.516   $υd_6$ = 64.14
$r_{13}$ = ∞
 $d_{13}$ = 5.5000
$r_{14}$ = ∞
 $d_{14}$ = 0.4000   $nd_7$ = 1.516   $υd_7$ = 64.14
$r_{15}$ = ∞
 $d_{15}$ = 0.1524
$r_{16}$ = ∞ (image plane)
Constant of the cone (ε) and aspheric coefficients (A, B, C, D, E)
(Third order)
ε = 1,
A = 7.45640 × 10$^{-4}$, B = 2.52063 × 10$^{-5}$,
C = −4.16410 × 10$^{-7}$, D = 3.01641 × 10$^{-8}$,
E = 2.15863 × 10$^{-8}$
(Fourth order)
ε = 1,
A = 9.38975 × 10$^{-4}$, B = 3.52889 × 10$^{-5}$,
C = −7.37831 × 10$^{-6}$, D = 1.15453 × 10$^{-6}$,
E = −3.94475 × 10$^{-8}$
(Tenth order)
ε = 1,
A = 1.70005 × 10$^{-4}$, B = −4.72281 × 10$^{-5}$,
C = 9.51867 × 10$^{-6}$, D = −4.72118 × 10$^{-7}$,
E = −3.49177 × 10$^{-9}$
(Eleventh order)
ε = 1,
A = 1.39589 × 10$^{-3}$, B = −3.85409 × 10$^{-5}$,
C = 9.95823 × 10$^{-6}$, D = −4.53243 × 10$^{-7}$,
E = −1.54170 × 10$^{-9}$
(Values related to conditional expression (1))
θ3 (temperature-dependent variation of relative refractive index for d-line of negative lens $L_{321}$) = 9.6
θ2 (temperature-dependent variation of relative refractive index for d-line of positive lens $L_{312}$) = 5.5
|θ3/θ2| = 1.75
(Values related to conditional expression (2))
F2 (focal length of rear group $G_{32}$) = 10.89
f21 (focal length of negative lens $L_{321}$) = −8.10
F2/f21 = −1.34
(Values related to conditional expression (3))
F1 (focal length of front group $G_{31}$) = 6.40
f12 (focal length of positive lens $L_{312}$) = 6.22
F1/f12 = 1.03
(Values related to conditional expression (4))
υ22 (Abbe number for d-line of positive lens $L_{322}$ (second lens)) = 95.01
υ21 (Abbe number for d-line of negative lens $L_{321}$ (first lens)) = 17.02
υ22/υ21 = 5.59
(Values related to conditional expression (5))
f23 (focal length of positive lens $L_{323}$ (third lens)) = 19.03
F1 (focal length of front group $G_{31}$) = 6.40
|f23/F1| = 2.98

Figure 6:
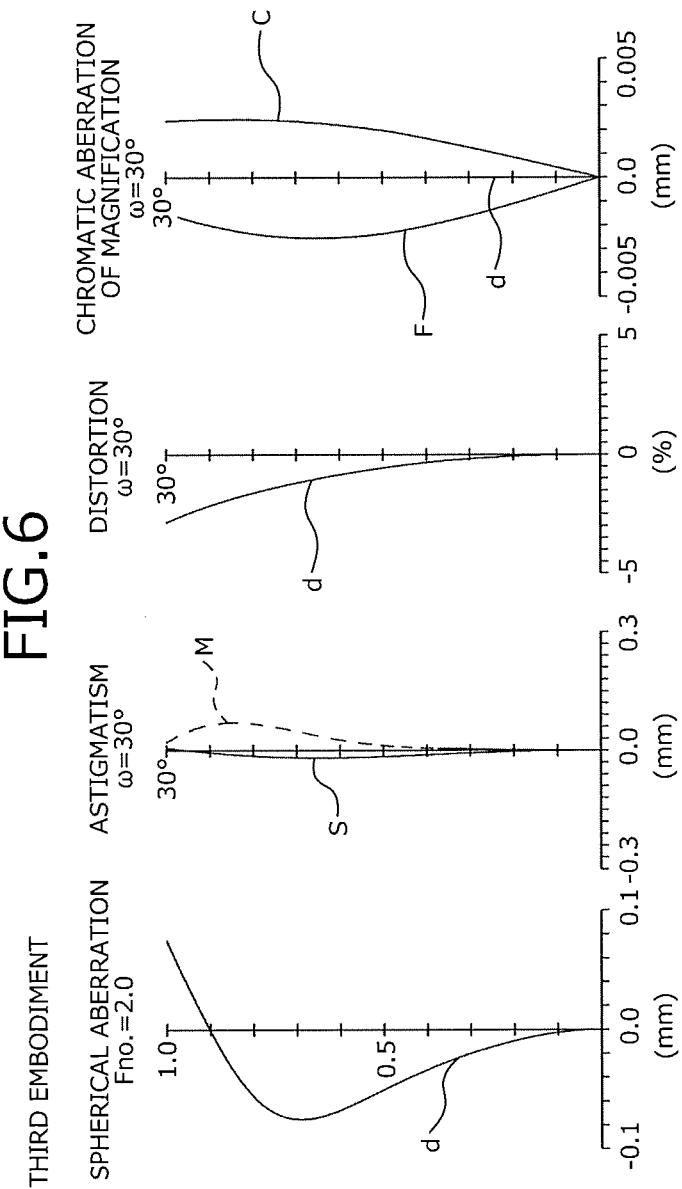
FIG. 6 is a diagram of various types of aberration occurring in the imaging optical system according to the third embodiment.

FIG. 6 is a diagram of various types of aberration occurring in the imaging optical system according to the third embodiment. In the diagram, for the curve depicting spherical aberration, the vertical axis represents the F number (Fno.) and wavelength characteristics corresponding to d-line (λ=587.56 nm) are depicted. For curves depicting astigmatism, the vertical axis represents the half angle of view (ω) and wavelength characteristics corresponding to d-line (λ=587.56 nm) are depicted. For curves depicting astigmatism, the solid line depicts characteristics of the sagittal plane (S) and the broken line depicts characteristics on the meridonal plane (M). For the curve depicting distortion, the vertical axis represents the half angle of view (ω) and wavelength characteristics corresponding to d-line (λ=587.56 nm) are depicted. For curves depicting chromatic aberration of magnification, the vertical axis represents the half angle of view (ω), d represents wavelength characteristics corresponding to d-line (λ=587.56 nm), F represents wavelength characteristics corresponding to F-line (λ=486.13 nm), and C represents wavelength characteristics corresponding to C-line (λ=656.27 nm).

Figure 7:
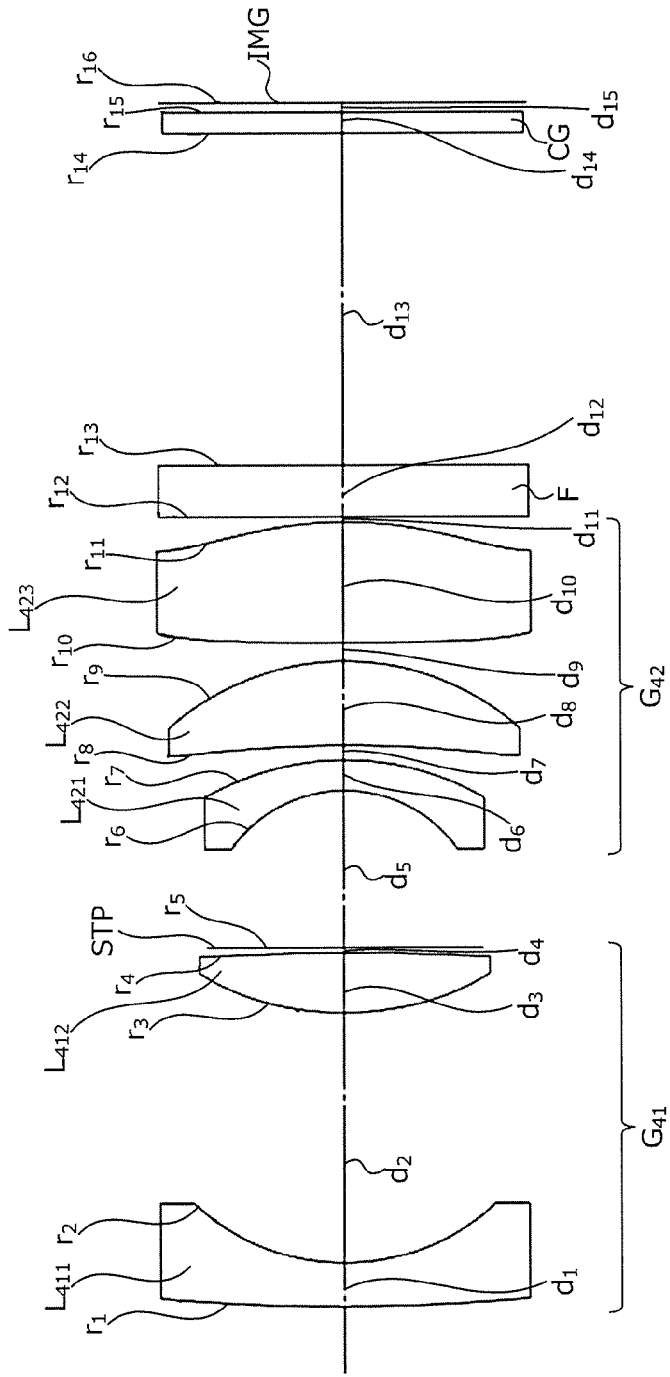
FIG. 7 is a diagram depicting, along the optical axis, a configuration of the imaging optical system according to a fourth embodiment.

FIG. 7 is a diagram depicting, along the optical axis, a configuration of the imaging optical system according to a fourth embodiment. The imaging optical system is configured to include sequentially from the object side nearest a non-depicted object, a front group $G_{41}$ having a positive refractive power, the diaphragm STP prescribing a given aperture, and a rear group $G_{42}$ having a positive refractive power. Between the rear group $G_{42}$ and the image plane IMG, the optical filter F and the cover glass CG are disposed sequentially from the object side. At the image plane IMG, the light receiving surface of the solid state image sensor is disposed.

The front group $G_{41}$ is configured to include sequentially from the object side, a negative lens $L_{411}$ and a positive lens $L_{412}$. Both surfaces of the positive lens $L_{412}$ are aspheric.

The rear group $G_{42}$ is configured to include sequentially from the object side, a negative lens $L_{421}$ (first lens), a positive lens $L_{422}$ (second lens), and a positive lens $L_{423}$ (third lens). The surface on the object side of the negative lens $L_{421}$ is concave. Both surfaces of the positive lens $L_{423}$ are aspheric.

Here, various types of data related to the imaging optical system according to the fourth embodiment are given.

f (focal length of entire imaging optical system) = 6.0
Fno. (F number) = 2.0
2ω (angle of view) = 60.0
(Lens data)

| | | | |
|---|---|---|---|
| $r_1$ = 41.1116 | | | |
| $d_1$ = 0.8519 | $nd_1$ = 1.658 | $vd_1$ = 50.85 | |
| $r_2$ = 4.2164 | | | |
| $d_2$ = 4.8778 | | | |
| $r_3$ = 6.1042 (aspheric) | | | |
| $d_3$ = 1.1727 | $nd_2$ = 1.851 | $vd_2$ = 40.10 | |
| $r_4$ = −35.0171 (aspheric) | | | |
| $d_4$ = 0.0983 | | | |
| $r_5$ = ∞ (diaphragm) | | | |
| $d_5$ = 3.0647 | | | |
| $r_6$ = −2.6567 | | | |
| $d_6$ = 0.5972 | $nd_3$ = 2.003 | $vd_3$ = 19.32 | |
| $r_7$ = −5.3099 | | | |
| $d_7$ = 0.2841 | | | |
| $r_8$ = −24.7903 | | | |
| $d_8$ = 1.6508 | $nd_4$ = 1.593 | $vd_4$ = 68.62 | |
| $r_9$ = −5.0088 | | | |
| $d_9$ = 0.3589 | | | |
| $r_{10}$ = 128.1394 (aspheric) | | | |
| $d_{10}$ = 2.3479 | $nd_5$ = 1.553 | $vd_5$ = 71.68 | |
| $r_{11}$ = −7.2545 (aspheric) | | | |
| $d_{11}$ = 0.1000 | | | |
| $r_{12}$ = ∞ | | | |
| $d_{12}$ = 1.0000 | $nd_6$ = 1.516 | $vd_6$ = 64.14 | |
| $r_{13}$ = ∞ | | | |
| $d_{13}$ = 6.5000 | | | |
| $r_{14}$ = ∞ | | | |
| $d_{14}$ = 0.4000 | $nd_7$ = 1.516 | $vd_7$ = 64.14 | |
| $r_{15}$ = ∞ | | | |
| $d_{15}$ = 0.1918 | | | |
| $r_{16}$ = ∞ (image plane) | | | |

Constant of the cone (ε) and aspheric coefficients (A, B, C, D, E)

-continued (Third order)
ε = 1,
A = 1.20488 × 10⁻³, B = 7.47898 × 10⁻⁵,
C = −8.79387 × 10⁻⁶, D = 5.62957 × 10⁻⁷,
E = −1.28602 × 10⁻⁹
(Fourth order)
ε = 1,
A = 6.92038 × 10⁻⁴, B = 5.12202 × 10⁻⁵,
C = −1.19177 × 10⁻⁵, D = 8.34322 × 10⁻⁷,
E = −1.81539 × 10⁻⁸
(Tenth order)
ε = 1,
A = 1.67025 × 10⁻⁴, B = −5.83690 × 10⁻⁷,
C = 1.23322 × 10⁻⁵, D = −9.90837 × 10⁻⁷,
E = 2.66409 × 10⁻⁸
(Eleventh order)
ε = 1,
A = 1.33035 × 10⁻³, B = 5.03731 × 10⁻⁵,
C = 1.45378 × 10⁻⁶, D = 1.30131 × 10⁻⁷,
E = −6.79719 × 10⁻⁹
(Values related to conditional expression (1))
θ3 (temperature-dependent variation of relative refractive index for d-line of negative lens $L_{421}$) = 6.8
θ2 (temperature-dependent variation of relative refractive index for d-line of positive lens $L_{412}$) = 7.5
|θ3/θ2| = 0.91
(Values related to conditional expression (2))
F2 (focal length of rear group $G_{42}$) = 12.48
f21 (focal length of negative lens $L_{421}$) = −5.98
F2/f21 = −2.09
(Values related to conditional expression (3))
F1 (focal length of front group $G_{41}$) = 7.52
f12 (focal length of positive lens $L_{412}$) = 6.19
F1/f12 = 1.21
(Values related to conditional expression (4))
υ22 (Abbe number for d-line of positive lens $L_{422}$ (second lens)) = 68.62
υ21 (Abbe number for d-line of negative lens $L_{421}$ (first lens)) = 19.32
υ22/υ21 = 3.71
(Values related to conditional expression (5))
f23 (focal length of positive lens $L_{423}$ (third lens)) = 12.49
F1 (focal length of front group $G_{41}$) = 7.52
|f23/F1| = 1.66

Figure 8:
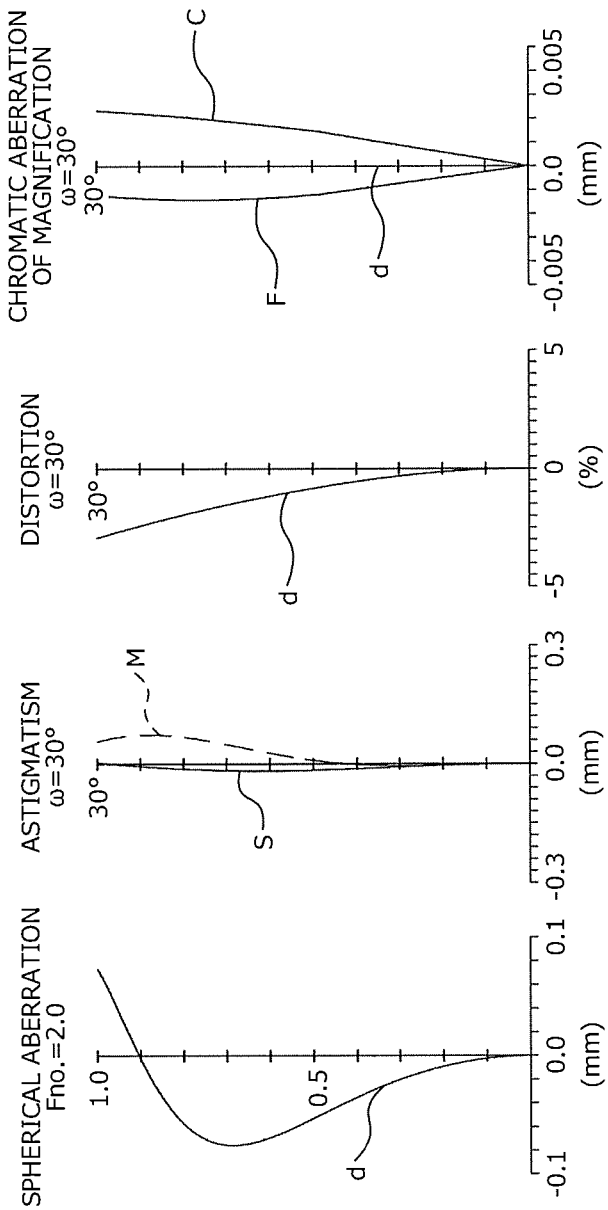
FIG. 8 is a diagram of various types of aberration occurring in the imaging optical system according to the fourth embodiment.

FIG. 8 is a diagram of various types of aberration occurring in the imaging optical system according to the fourth embodiment. In the diagram, for the curve depicting spherical aberration, the vertical axis represents the F number (Fno.) and wavelength characteristics corresponding to d-line (λ=587.56 nm) are depicted. For curves depicting astigmatism, the vertical axis represents the half angle of view (ω) and wavelength characteristics corresponding to d-line (λ=587.56 nm) are depicted. For curves depicting astigmatism, the solid line depicts characteristics of the sagittal plane (S) and the broken line depicts characteristics on the meridonal plane (M). For the curve depicting distortion, the vertical axis represents the half angle of view (ω) and wavelength characteristics corresponding to d-line (λ=587.56 nm) are depicted. For curves depicting chromatic aberration of magnification, the vertical axis represents the half angle of view (ω), d represents wavelength characteristics corresponding to d-line (λ=587.56 nm), F represents wavelength characteristics corresponding to F-line (λ=486.13 nm), and C represents wavelength characteristics corresponding to C-line (λ=656.27 nm).

Figure 9:
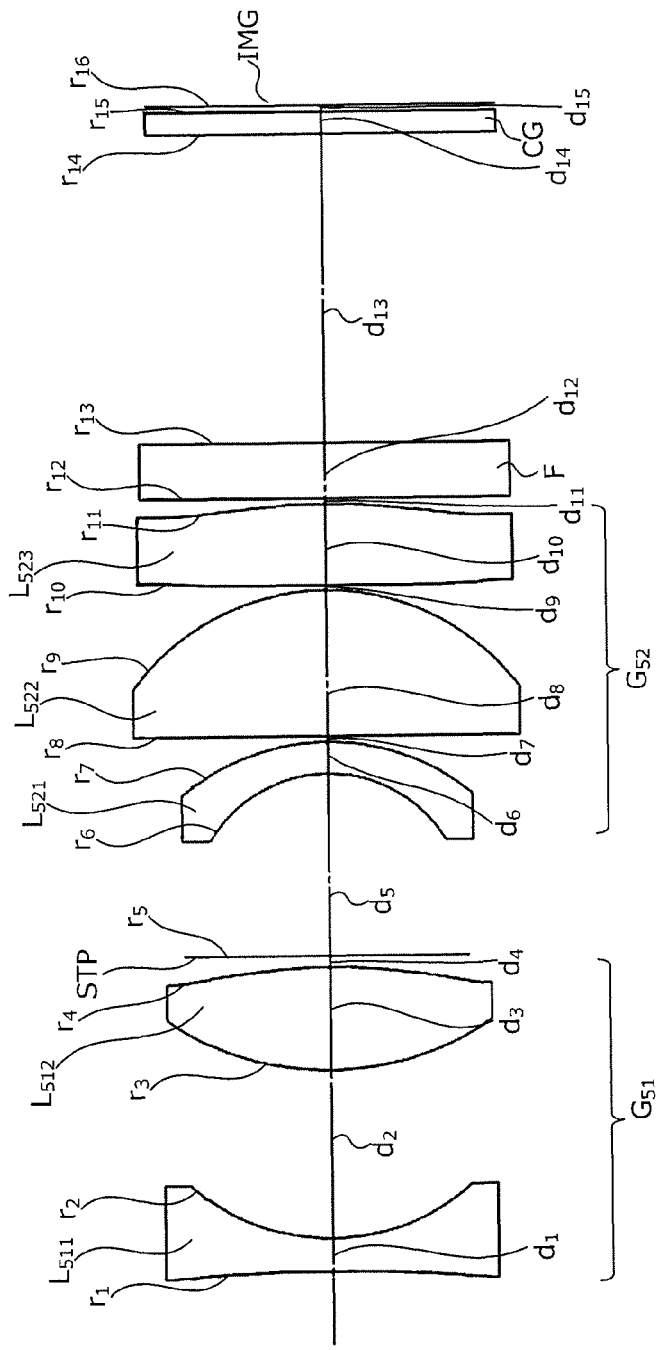
FIG. 9 is a diagram depicting, along the optical axis, a configuration of the imaging optical system according to a fifth embodiment.

FIG. 9 is a diagram depicting, along the optical axis, a configuration of the imaging optical system according to a fifth embodiment. The imaging optical system is configured to include sequentially from the object side nearest a non-depicted object, a front group $G_{51}$ having a positive refractive power, the diaphragm STP prescribing a given aperture, and a rear group $G_{52}$ having a positive refractive power. Between the rear group $G_{52}$ and the image plane IMG, the optical filter F and the cover glass CG are disposed sequentially from the object side. At the image plane IMG, the light receiving surface of the solid state image sensor is disposed.

The front group $G_{51}$ is configured to include sequentially from the object side, a negative lens $L_{511}$ and a positive lens $L_{512}$. Both surfaces of the positive lens $L_{512}$ are aspheric.

The rear group $G_{52}$ is configured to include sequentially from the object side, a negative lens $L_{521}$ (first lens), a positive lens $L_{522}$ (second lens), and a positive lens $L_{523}$ (third lens). The surface on the object side of the negative lens $L_{521}$ is concave. Both surfaces of the positive lens $L_{523}$ are aspheric.

Here, various types of data related to the imaging optical system according to the fifth embodiment are given.

f (focal length of entire imaging optical system) = 6.0
Fno. (F number) = 2.0
2ω (angle of view) = 60.0
(Lens data)
$r_1$ = −32.0676
    $d_1$ = 0.5995      $nd_1$ = 1.658      $υd_1$ = 50.85
$r_2$ = 3.7450
    $d_2$ = 3.0398
$r_3$ = 5.3867 (aspheric)
    $d_3$ = 1.8428      $nd_2$ = 1.755      $υd_2$ = 51.16
$r_4$ = −10.9413 (aspheric)
    $d_4$ = 0.2050
$r_5$ = ∞ (diaphragm)
    $d_5$ = 3.308
$r_6$ = −2.4348
    $d_6$ = 0.5732      $nd_3$ = 2.003      $υd_3$ = 19.32
$r_7$ = −4.0218
    $d_7$ = 0.1002
$r_8$ = ∞
    $d_8$ = 2.6507      $nd_4$ = 1.437      $υd_4$ = 95.10
$r_9$ = −4.2484
    $d_9$ = 0.0874
$r_{10}$ = −149.7661 (aspheric)
    $d_{10}$ = 1.4626      $nd_5$ = 1.592      $υd_5$ = 67.02
$r_{11}$ = −10.2978 (aspheric)
    $d_{11}$ = 0.1000
$r_{12}$ = ∞
    $d_{12}$ = 1.0000      $nd_6$ = 1.516      $υd_6$ = 64.14
$r_{13}$ = ∞
    $d_{13}$ = 5.6000
$r_{14}$ = ∞
    $d_{14}$ = 0.4000      $nd_7$ = 1.516      $υd_7$ = 64.14
$r_{15}$ = ∞
    $d_{15}$ = 0.1179
$r_{16}$ = ∞ (image plane)
Constant of the cone (ε) and aspheric coefficients (A, B, C, D, E)
(Third order)
ε = 1,
A = 4.08337 × $10^{-4}$, B = 1.71269 × $10^{-5}$,
C = −3.98433 × $10^{-6}$, D = 1.90505 × $10^{-7}$,
E = 7.03809 × $10^{-8}$
(Fourth order)
ε = 1,
A = 3.66795 × $10^{-4}$, B = 8.40142 × $10^{-5}$,
C = −1.67953 × $10^{-5}$, D = 2.42398 × $10^{-6}$,
E = −2.47079 × $10^{-8}$
(Tenth order)
ε = 1,
A = 1.38636 × $10^{-3}$, B = −1.97184 × $10^{-4}$,
C = 4.68211 × $10^{-5}$, D = −4.17903 × $10^{-6}$,
E = 1.04142 × $10^{-7}$
(Eleventh order)
ε = 1,
A = 2.79141 × $10^{-3}$, B = −2.00511 × $10^{-4}$,
C = 5.41425 × $10^{-5}$, D = −4.57761 × $10^{-6}$,
E = 1.15891 × $10^{-7}$
(Values related to conditional expression (1))
θ3 (temperature-dependent variation of relative refractive index for d-line of negative lens $L_{521}$) = 6.8
θ2 (temperature-dependent variation of relative refractive index for d-line of positive lens $L_{512}$) = 4.7
|θ3/θ2| = 1.45
(Values related to conditional expression (2))
F2 (focal length of rear group $G_{52}$) = 12.19
f21 (focal length of negative lens $L_{521}$) = −7.51
F2/f21 = −1.62
(Values related to conditional expression (3))
F1 (focal length of front group $G_{51}$) = 7.31
f12 (focal length of positive lens $L_{512}$) = 5.02
F1/f12 = 1.46
(Values related to conditional expression (4))
υ22 (Abbe number for d-line of positive lens $L_{522}$ (second lens)) = 95.10
υ21 (Abbe number for d-line of negative lens $L_{521}$ (first lens)) = 19.32
υ22/υ21 = 4.92
(Values related to conditional expression (5))
f23 (focal length of positive lens $L_{523}$ (third lens)) = 18.61
F1 (focal length of front group $G_{51}$) = 7.31
|f23/F1| = 2.54

Figure 10:
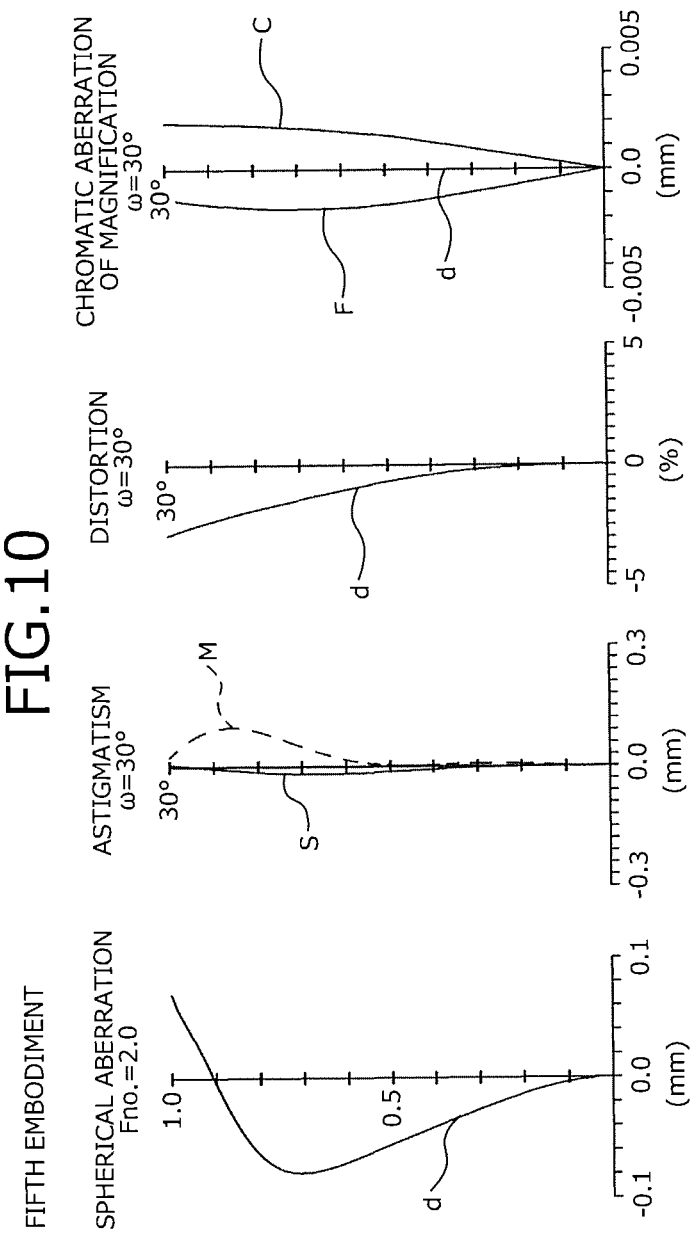
FIG. 10 is a diagram of various types of aberration occurring in the imaging optical system according to the fifth embodiment.

FIG. 10 is a diagram of various types of aberration occurring in the imaging optical system according to the fifth embodiment. In the diagram, for the curve depicting spherical aberration, the vertical axis represents the F number (Fno.) and wavelength characteristics corresponding to d-line (λ=587.56 nm) are depicted. For curves depicting astigmatism, the vertical axis represents the half angle of view (ω) and wavelength characteristics corresponding to d-line (λ=587.56 nm) are depicted. For curves depicting astigmatism, the solid line depicts characteristics of the sagittal plane (S) and the broken line depicts characteristics on the meridonal plane (M). For the curve depicting distortion, the vertical axis represents the half angle of view (ω) and wavelength characteristics corresponding to d-line (λ=587.56 nm) are depicted. For curves depicting chromatic aberration of magnification, the vertical axis represents the half angle of view (ω), d represents wavelength characteristics corresponding to d-line (λ=587.56 nm), F represents wavelength characteristics corresponding to F-line (λ=486.13 nm), and C represents wavelength characteristics corresponding to C-line (λ=656.27 nm).

Figure 11:
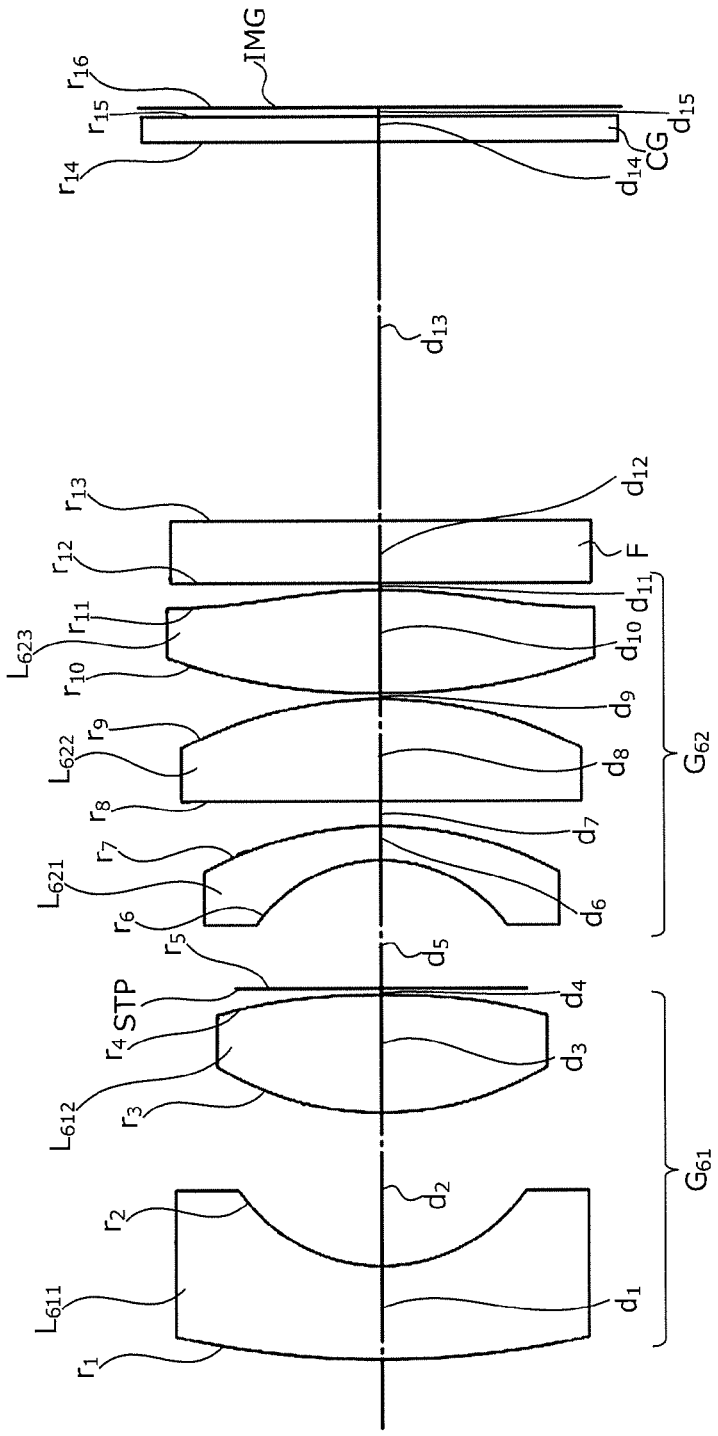
FIG. 11 is a diagram depicting, along the optical axis, a configuration of the imaging optical system according to a sixth embodiment.

FIG. 11 is a diagram depicting, along the optical axis, a configuration of the imaging optical system according to a sixth embodiment. The imaging optical system is configured to include sequentially from the object side nearest a non-depicted object, a front group $G_{61}$ having a positive refractive power, the diaphragm STP prescribing a given aperture, and a rear group $G_{62}$ having a positive refractive power. Between the rear group $G_{62}$ and the image plane IMG, the optical filter F and the cover glass CG are disposed sequentially from the object side. At the image plane IMG, the light receiving surface of the solid state image sensor is disposed.

The front group $G_{61}$ is configured to include sequentially from the object side, a negative lens $L_{611}$ and a positive lens $L_{612}$. Both surfaces of the positive lens $L_{612}$ are aspheric.

The rear group $G_{62}$ is configured to include sequentially from the object side, a negative lens $L_{621}$ (first lens), a positive lens $L_{622}$ (second lens), and a positive lens $L_{623}$ (third lens). The surface on the object side of the negative lens $L_{621}$ is concave. Both surfaces of the positive lens $L_{623}$ are aspheric.

Here, various types of data related to the imaging optical system according to the sixth embodiment are given.

f (focal length of entire imaging optical system) = 6.0
Fno. (F number) = 2.0
2ω (angle of view) = 60.0
(Lens data)
$r_1$ = 14.8694
    $d_1$ = 1.5052      $nd_1$ = 1.658      $υd_1$ = 50.85
$r_2$ = 2.7207
    $d_2$ = 2.4484

Figure 12:
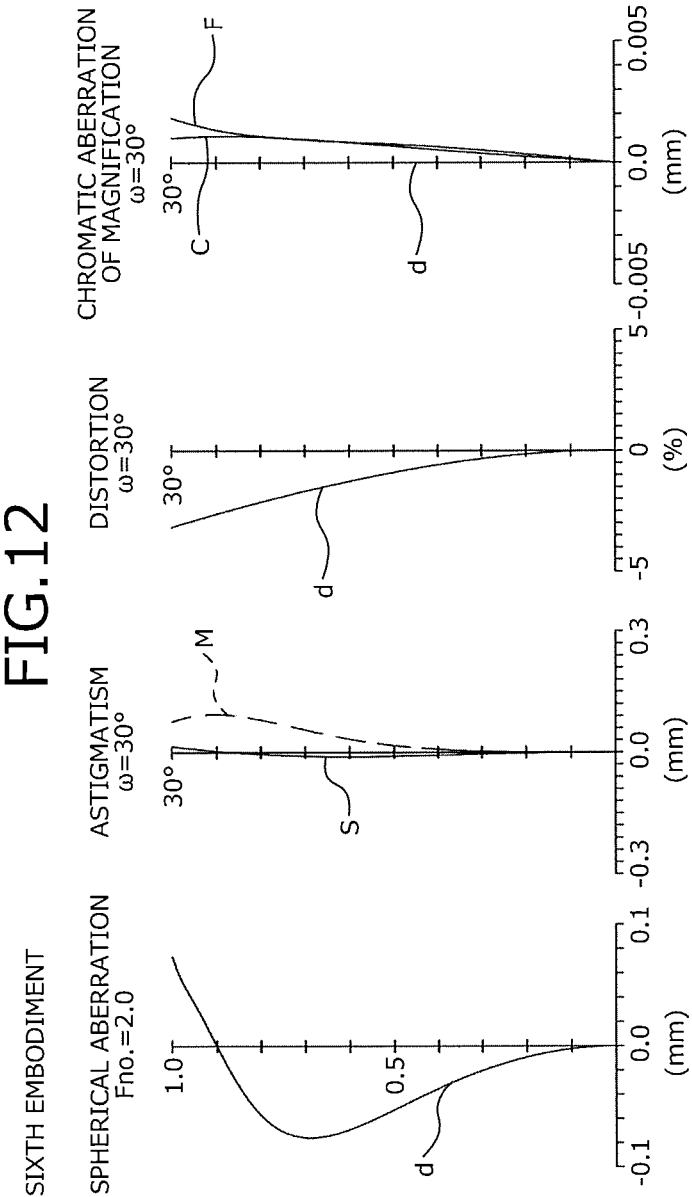
FIG. 12 is a diagram of various types of aberration occurring in the imaging optical system according to the sixth embodiment.

-continued $r_3 = 5.0757$ (aspheric)
$d_3 = 1.8837$          $nd_2 = 1.851$    $\nu d_2 = 40.10$
$r_4 = -14.0158$ (aspheric)
$d_4 = 0.0959$
$r_5 = \infty$ (diaphragm)
$d_5 = 2.0386$
$r_6 = -2.4234$
$d_6 = 0.5440$          $nd_3 = 1.923$    $\nu d_3 = 18.90$
$r_7 = -5.7476$
$d_7 = 0.3976$
$r_8 = -5253710.9$
$d_8 = 1.6284$          $nd_4 = 1.593$    $\nu d_4 = 68.62$
$r_9 = -6.7356$
$d_9 = 0.0893$
$r_{10} = 11.7208$ (aspheric)
$d_{10} = 1.6544$        $nd_5 = 1.592$    $\nu d_5 = 67.02$
$r_{11} = -8.8918$ (aspheric)
$d_{11} = 0.1000$
$r_{12} = \infty$
$d_{12} = 1.0000$        $nd_6 = 1.516$    $\nu d_6 = 64.14$
$r_{13} = \infty$
$d_{13} = 6.0500$
$r_{14} = \infty$
$d_{14} = 0.4000$        $nd_7 = 1.516$    $\nu d_7 = 64.14$
$r_{15} = \infty$
$d_{15} = 0.1471$
$r_{16} = \infty$ (image plane)
Constant of the cone ($\epsilon$) and aspheric coefficients (A, B, C, D, E)
(Third order)
$\epsilon = 1$,
$A = 8.25004 \times 10^{-4}, B = 2.62772 \times 10^{-5}$,
$C = -1.35690 \times 10^{-5}, D = -2.97073 \times 10^{-7}$,
$E = -1.68159 \times 10^{-8}$
(Fourth order)
$\epsilon = 1$,
$A = -1.94258 \times 10^{-3}, B = 1.38913 \times 10^{-5}$,
$C = -9.56376 \times 10^{-6}, D = 5.67059 \times 10^{-7}$,
$E = -2.73708 \times 10^{-9}$
(Tenth order)
$\epsilon = 1$,
$A = 2.32775 \times 10^{-4}, B = 6.07502 \times 10^{-5}$,
$C = 4.07910 \times 10^{-6}, D = -7.29772 \times 10^{-7}$,
$E = 1.14943 \times 10^{-8}$
(Eleventh order)
$\epsilon = 1$,
$A = 2.42461 \times 10^{-3}, B = 7.21766 \times 10^{-5}$,
$C = 5.52775 \times 10^{-6}, D = -6.96671 \times 10^{-7}$,
$E = 4.62476 \times 10^{-9}$
(Values related to conditional expression (1))
$\theta 3$ (temperature-dependent variation of relative refractive
index for d-line of negative lens $L_{621}$) = 2.1
$\theta 2$ (temperature-dependent variation of relative refractive
index for d-line of positive lens $L_{612}$) = 7.5
$|\theta 3/\theta 2| = 0.28$
(Values related to conditional expression (2))
F2 (focal length of rear group $G_{62}$) = 11.79
f21 (focal length of negative lens $L_{621}$) = $-4.93$
F2/f21 = $-2.39$
(Values related to conditional expression (3))
F1 (focal length of front group $G_{61}$) = 7.50
f12 (focal length of positive lens $L_{612}$) = 4.58
F1/f12 = 1.64
(Values related to conditional expression (4))
$\nu 22$ (Abbe number for d-line of positive lens $L_{622}$ (second lens)) = 68.62
$\nu 21$ (Abbe number for d-line of negative lens $L_{621}$ (first lens)) = 18.90
$\nu 22/\nu 21 = 3.62$
(Values related to conditional expression (5))
f23 (focal length of positive lens $L_{623}$ (third lens)) = 8.80
F1 (focal length of front group $G_{61}$) = 7.50
$|f23/F1| = 1.17$ FIG. 12 is a diagram of various types of aberration occurring in the imaging optical system according to the sixth embodiment. In the diagram, for the curve depicting spherical aberration, the vertical axis represents the F number (Fno.) and wavelength characteristics corresponding to d-line ($\lambda$=587.56 nm) are depicted. For curves depicting astigmatism, the vertical axis represents the half angle of view ($\omega$) and wavelength characteristics corresponding to d-line ($\lambda$=587.56 nm) are depicted. For curves depicting astigmatism, the solid line depicts characteristics of the sagittal plane (S) and the broken line depicts characteristics on the meridonal plane (M). For the curve depicting distortion, the vertical axis represents the half angle of view ($\omega$) and wavelength characteristics corresponding to d-line ($\lambda$=587.56 nm) are depicted. For curves depicting chromatic aberration of magnification, the vertical axis represents the half angle of view ($\omega$), d represents wavelength characteristics corresponding to d-line ($\lambda$=587.56 nm), F represents wavelength characteristics corresponding to F-line ($\lambda$=486.13 nm), and C represents wavelength characteristics corresponding to C-line ($\lambda$=656.27 nm).

Among the values for each of the embodiments, $r_1, r_2, \ldots$ indicate the radius of curvature of lens surfaces, aperture surfaces, etc.; $d_1, d_2, \ldots$ indicate the thickness of the lenses, the aperture, etc. or the interval between the surfaces thereof; $nd_1, nd_2, \ldots$ indicate the refraction index of the lenses with respect to the d-line ($\lambda$=546.074 nm); and $\nu d_1, \nu d_2, \ldots$ indicate the Abbe number for the d-line ($\lambda$=587.56 nm) of the lenses. Lengths are indicated in units of "mm"; and angles are indicated in "degrees".

In the embodiments, X, which represents the amount of aspheric sag from the surface apex on the optical axis (the direction of the image plane being positive), is expressed by the equation below; where, H represents a distance from the optical axis toward the outer diameter of the lens, R represents paraxial radius of curvature, $\epsilon$ represents the constant of the cone, and A, B, C, D, and E respectively represent fourth, sixth, eighth, tenth, and twelfth order aspheric coefficients.

$$X = \frac{H^2/R}{1+\sqrt{1-((zH)^2/R^2)}} + AH^4 + BH^6 + CH^8 + DH^{10} + EH^{12} \quad [1]$$

As described, the imaging optical system of the embodiments satisfies conditional expression (1), whereby the temperature-dependent variation of the relative refractive index of the lens disposed at a position that most easily influences drops in resolution consequent to temperature variation is properly set, enabling high resolution to be maintained over a wide temperature range, from low temperatures to high temperatures. In particular, satisfying conditional expression (1) enables focus error of the optical system to be suppressed during high temperatures (up to 105 degrees C.) and low temperatures (down to −40 degrees C.). Therefore, without problems, the imaging optical system of the embodiments can be used on vehicle cameras provided in vehicles, which are subject to high summer temperatures, surveillance cameras installed outdoors where changes in environmental temperature is significant, etc.

Further satisfying conditional expressions (2) and (3) enables an imaging optical system having a deep depth of focus to be realized. If the depth of focus is deep, the occurrence of focus error is suppressed during extreme temperatures and high resolution can be maintained over a wide temperature range, from low temperatures to high temperatures. Further, if the depth of focus is deep, image quality is not easily affected by shifts in lens centers occurring at the time of product manufacturing, enabling favorable image quality to be maintained.

Sequentially satisfying conditional expression (4) and conditional expression (5) is effective in preventing drops in peripheral illumination and in correcting chromatic aberration of magnification, astigmatism, and distortion, essential for maintaining high resolution. In the imaging optical system of the embodiments, lenses having properly shaped aspheric surfaces are disposed, enabling greater aberration correction performance with fewer lenses.

As described, the imaging optical system according to the present invention is useful for imaging apparatuses from which high resolution is demanded over a wide temperature range, from low temperatures to high temperatures, and is particularly suitable for vehicle cameras and surveillance camera used under conditions of extreme environmental temperature changes.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

This application is based upon and claims the benefit of priority of the prior Japanese Patent Application No. 2014-250831, filed on Dec. 11, 2014, the entire contents of which are incorporated herein by reference.

What is claimed is:

1. An imaging optical system comprising sequentially from an object side:
   a front group configured to include a positive lens disposed at a position nearest a diaphragm;
   the diaphragm; and
   a rear group configured to include a negative lens disposed at a position nearest the diaphragm, wherein
   the imaging optical system satisfies a conditional expression (1) $0.27 \leq |\theta 3/\theta 2| \leq 1.80$, where $\theta 3$ represents temperature-dependent variation of relative refractive index for d-line of the negative lens and $\theta 2$ represents temperature-dependent variation of relative refractive index for d-line of the positive lens.

2. The imaging optical system according to claim 1, wherein the imaging optical system satisfies a conditional expression (2) $-2.4 \leq F2/f21 \leq -1.3$ and a conditional expression (3) $1.00 \leq F1/f12 \leq 1.65$, where F2 represents a focal length of the rear group, f21 represents a focal length of the negative lens, F1 represents a focal length of the front group, and f12 represents a focal length of the positive lens.

3. The imaging optical system according to claim 1, wherein
   the rear group is configured to include sequentially from the object side, a first lens, a second lens, and a third lens, and
   the imaging optical system satisfies a conditional expression (4) $3.6 \leq v22/v21 \leq 5.6$, where v22 represents an Abbe number for d-line of the second lens and v21 represents an Abbe number for d-line of the first lens.

4. The imaging optical system according to claim 1, wherein
   the rear group is configured to include sequentially from the object side, a first lens, a second lens, and a third lens, and
   the imaging optical system satisfies a conditional expression (5) $1.15 \leq |f23/F1| \leq 3.0$, where f23 represents a focal length of the third lens and F1 represents a focal length of the front group.

* * * * *